US010163365B2

(12) United States Patent
Sisamos

(10) Patent No.: US 10,163,365 B2
(45) Date of Patent: Dec. 25, 2018

(54) SYSTEM AND METHOD FOR TEACHING PROGRAMMING OF DEVICES

(71) Applicant: ENGINO.NET LTD., Limassol (CY)

(72) Inventor: Costas Sisamos, Limassol (CY)

(73) Assignee: Engino.net Ltd., Limassol (CY)

( * ) Notice: Subject to any disclaimer, the term of this patent is extended or adjusted under 35 U.S.C. 154(b) by 230 days.

(21) Appl. No.: 15/166,915

(22) Filed: May 27, 2016

(65) Prior Publication Data
US 2016/0284232 A1 Sep. 29, 2016

Related U.S. Application Data

(63) Continuation of application No. PCT/EP2014/075858, filed on Nov. 27, 2014.
(Continued)

(51) Int. Cl.
G09B 5/02 (2006.01)
G09B 19/00 (2006.01)
(Continued)

(52) U.S. Cl.
CPC ..... G09B 19/0053 (2013.01); G05B 19/0426 (2013.01); G09B 5/02 (2013.01); G09B 9/00 (2013.01)

(58) Field of Classification Search
CPC ........ G09B 19/0053; G09B 5/02; G09B 9/00; G05B 19/0426
See application file for complete search history.

(56) References Cited

U.S. PATENT DOCUMENTS 5,705,906 A 1/1998 Tanabe et al.
6,167,328 A 12/2000 Takaoka et al.
(Continued)

FOREIGN PATENT DOCUMENTS

CN 1424664 A 6/2003

OTHER PUBLICATIONS

R. Bishoff, The MORPHA Style Guide for Icon-based Programming, 2002, http://citeseerx.ist.psu.edu/viewdoc/download?doi=10.1.1.379.1194&rep=rep1&type=pdf (Year: 2002).*
(Continued)

Primary Examiner — Corbett B Coburn
(74) Attorney, Agent, or Firm — Eschweiler & Potashnik, LLC

(57) ABSTRACT

A system and method for teaching computer programming contains software for providing a reference to a device and providing multiple views of a programming of the device. A textual view has programming code for controlling the device, a graphical view has icons to be placed, interconnected, and modified in a flow diagram in a programming area, and a simulation view displays a configuration of the device and a response of the device to the programming code. A configuration of the icons, when placed in the programming area, represent blocks of the programming code, where each block corresponds to a behavior of a respective programming object. The blocks behave in a specific manner based on the configuration of the icons. An input device modifies the programming code in the textual view, icons and interconnection in the graphical view, and configuration of the device in the simulation view, thus modifying the programming.

20 Claims, 10 Drawing Sheets

Related U.S. Application Data

(60) Provisional application No. 61/909,479, filed on Nov. 27, 2013.

(51) Int. Cl.
*G05B 19/042* (2006.01)
*G09B 9/00* (2006.01)

(56) References Cited

U.S. PATENT DOCUMENTS

| | | | | |
|---|---|---|---|---|
| 6,558,431 | B1 * | 5/2003 | Lynch | G06F 17/3089 |
| | | | | 707/E17.116 |
| 6,879,862 | B2 | 4/2005 | Brown et al. | |
| 7,236,854 | B2 | 6/2007 | Pretlove et al. | |
| 7,620,895 | B2 | 11/2009 | Adkins et al. | |
| 7,984,423 | B2 * | 7/2011 | Kodosky | G05B 19/0426 |
| | | | | 715/763 |
| 8,291,318 | B2 * | 10/2012 | Budreau | G06F 9/453 |
| | | | | 715/704 |
| 9,102,061 | B2 * | 8/2015 | Schmirgel | B25J 9/1671 |
| 2002/0032900 | A1 * | 3/2002 | Charisius | G06F 8/20 |
| | | | | 717/106 |
| 2003/0066050 | A1 * | 4/2003 | Wang | G05B 19/045 |
| | | | | 717/105 |
| 2003/0131337 | A1 | 7/2003 | Perumainar | |
| 2004/0186623 | A1 | 9/2004 | Dooley et al. | |
| 2005/0033713 | A1 * | 2/2005 | Bala | G06F 9/453 |
| | | | | 706/59 |
| 2005/0149231 | A1 * | 7/2005 | Pretlove | B25J 9/1671 |
| | | | | 700/264 |
| 2005/0155015 | A1 * | 7/2005 | Novacek | G06F 8/34 |
| | | | | 717/105 |
| 2006/0178778 | A1 * | 8/2006 | Fuhlbrigge | B25J 9/1656 |
| | | | | 700/264 |
| 2009/0222246 | A1 * | 9/2009 | Do | E21B 43/00 |
| | | | | 703/10 |
| 2011/0190938 | A1 | 8/2011 | Ekelund et al. | |
| 2011/0199194 | A1 | 8/2011 | Waldock et al. | |
| 2015/0261899 | A1 * | 9/2015 | Atohira | G06F 17/5009 |
| | | | | 703/7 |
| 2017/0220024 | A1 * | 8/2017 | Watanabe | B23P 19/04 |

OTHER PUBLICATIONS

International Search Report, International Application No. PCT/EP2014/075858, dated Feb. 24, 2015.

Munden, G. "Concurrency Issues in Programmable Brick Languages.", XP-002735459. Retrieved from http://www.library.umaine.edu.theses/pdf/MundenGE2000.pdf on Feb. 4, 2015, 124 pages.

Dunia, R. et al. "A Complete Progamming Framework for Process Control Education." 17th IEEE International Conference on Control Applications, Part of 2008 IEEE Multi-conference on Systems and Control, San Antonio, TX. Sep. 3-5, 2008. pp. 516-521.

Hao, Q. et al. Controling simulation study on two-wheeled self-balancing electrical motorcycle based on ADAMS and MATLAB. 2011 Cross Strait Quad-Regional Radio Science and Wireless Technology Conference. Jul. 26-30, 2011. pp. 1704-1707.

Girdling, J. et al. LEGOsheets: A Rule-Based Programming, Simulation and Manipulation Environment for the LEGO Programmable Brick. 11th IEEE International Symposium on Darmstadt, Germany. Sep. 5-9, 1995. pp. 172-179.

* cited by examiner

SYSTEM AND METHOD FOR TEACHING PROGRAMMING OF DEVICES

REFERENCE TO RELATED APPLICATION

This application is a continuation of PCT International Application Serial Number PCT/EP2014/075858 filed on Nov. 27, 2014, which further claims priority to and the benefit of U.S. Provisional Application Ser. No. 61/909,479 filed on Nov. 27, 2013, entitled "A Method for Teaching Programming of Devices", the entirety of which are hereby incorporated by reference as if fully set forth herein.

FIELD

The present disclosure relates generally to computer programming, and more specifically, to a system, apparatus, and method for teaching programming via a combination of a visual interface employing a text input, an interactive graphical display, and a physical or virtual toy device.

BACKGROUND

Robotic toys are popular toys for many, including both children and adults. Some robotic toys require continuous input from a user to perform tasks, while others are pre-programmed to perform specific predetermined actions or a series of tasks, where the user merely directs the robot to perform the predetermined actions or tasks. Still other robotic toys can be programmed by the user to perform many various actions or tasks, whereby the robot can be controlled by the user in a myriad of ways. However, in order to program the robotic toy, a degree of knowledge is typically required of the user, wherein the user may need to know or learn a particular programming language or have a fairly detailed understanding of programming steps.

An ongoing challenge for the computer industry is teaching users or students computer programming languages. In particular, when considering robotic toys geared toward younger children, such young children have been particularly difficult to teach programming languages, as the foresight and knowledge of the structure, terminology, and syntax of programs is often difficult for children to grasp.

In a manner similar to learning a foreign language, programming languages are typically based on numerous general concepts that need to be understood in order to successfully write, modify, and debug programs or applications. In addition to these general concepts, each programming language typically has its own command vocabulary that must be used with the proper syntax in order to attain the desired results and minimize syntax errors. Once the general vocabulary and grammar is understood, the student learning programming needs to understand the meaning of individual commands as well as combinations of commands or concepts in order to utilize the programming language to its full potential.

Conventional instructional tools and methods for teaching programming fail to provide both a learning environment conducive to learning for younger students, as the student is typically required to learn complex concepts in an unfamiliar manner. For example, typically, a number of lines of code or sets of programming statements are entered in a text format which is not only foreign the student, but also tedious and boring to younger students. When viewing a completed written program, the student can view the program textual steps, but the student cannot typically view the effect of individual statements or truly understand the language concepts. Such conventional teaching methods lead to frustration, syntax errors, (e.g., improper use of punctuation etc.), and eventually, the loss of interest in programming.

Various programming tools have been developed to assist programmers in more efficiently writing applications, but each of these tools fails in some aspect in addressing the needs of programming students, especially younger, beginner programmers. Further, these programming tools are intended to make programming more efficient, rather than to teach the broader concepts of the language. Conventional robotic toys and devices, for example, do not incorporate a structured flow for the programming thereof, and typically do not take into account a learning curve that gradually leads students to the attainment of programming knowledge through hands-on experience and playful activities.

Accordingly, a need exists for a tool for better teaching young users or students programming concepts and skills. Such a tool would be able to keep the attention of the young user and allowing them to use creativity while also teaching the broader concepts of programming in an efficient and user-friendly manner.

SUMMARY

The present disclosure is directed generally toward a system, apparatus, and method for teaching programming concepts through concurrent graphical, textual, and simulation views on a display. In particular, the present disclosure provides a novel system, method, and apparatus for teaching a child computer programming via the programming of a toy robot. Accordingly, the following presents a simplified summary of the disclosure in order to provide a basic understanding of some aspects of the disclosure. This summary is not an extensive overview of the disclosure. It is intended to neither identify key or critical elements of the disclosure nor delineate the scope of the disclosure. Its purpose is to present some concepts of the disclosure in a simplified form as a prelude to the more detailed description that is presented later.

According to one exemplary aspect of the present disclosure, a robotics system and method for teaching concepts of computer programming to a user is provided. In one particular example, the user is a child or other person having little to no programming experience. The robotics system of the present disclosure contains software for providing a reference to a device. The device in one example is a robotic toy in one or more of a physical form and a virtual form.

The software of the present disclosure concurrently provides on a display a plurality of views associated with a programming of the device. The display, for example, comprises one or more of a computer monitor, television, projection device, touch-screen, mobile phone display, and a handheld computing device.

In accordance with one example of the disclosure, the plurality of views provided on the display comprise a textual view, a graphical view, and a simulation view. The textual view, for example, displays a programming code for controlling the device, wherein the programming code is displayed as text. The graphical view, for example, provides a plurality of icons, wherein the plurality of icons are configured to be selectively placed, interconnected, and modified in the form of a flow diagram in a programming area of the graphical view. A configuration of the plurality of icons, when placed in the programming area, respectively represents a plurality of blocks of the programming code. Each of the plurality of blocks of the programming code, for example, respectively corresponds to a behavior of a respective programming object of the device, and the plurality of blocks of the programming code behave in a specific manner and in relation each other based on the configuration of the plurality of icons.

In one example, the simulation view is configured to display a configuration of the device and a response of the device to the programming code. The software is further configured to accept input from an input device by the user for modifying one or more of the programming code in the textual view, the icons and selective interconnection thereof in the graphical view, and the configuration of the device in the simulation view. The input device, for example, comprises one or more of a keyboard, mouse, touch-screen, mobile phone, handheld computing device, and an auditory input device. In one example, one or more icons are placed in the programming area of the graphical view by one or more of a drag and drop operation from an icon bar, a double-click-and-select operation from the icon bar, and a selection action performed in the programming area of the graphical view.

Accordingly, the input provided by the user modifies the programming of the device. For example, the plurality of views are updated and synchronized after the modification of one or more of the programming code, the plurality of icons, and the configuration of the device in any of the plurality of views. The plurality of views, for example, are configured to be updated and synchronized manually, automatically, or after a predefined pause after said modification. Further, any of the plurality of views may be modified, whereby the remainder of the plurality of views are accordingly updated and synchronized. As such, the user may view the programming code in the textual view in response to modifying the graphical view and/or simulation view, and accordingly learn and progress to more advanced modifications of the programming code directly within the textual view. Further, the plurality of views may be reset to a previous state after being updated and synchronized upon a request by the user. Once the programming code is modified through the textual view and/or graphical view, the user may realize that the modification did not produce the desired operation or effect. By being provided the opportunity to reset the plurality of views to a previous state, that the modification may be removed, thus enabling the user to try a different modification of the programming code.

In accordance with an exemplary aspect of the disclosure, the plurality of icons provided within the graphical view are selectively configured as one of a "WITH PREVIOUS" configuration and an "AFTER PREVIOUS" configuration. The "WITH PREVIOUS" configuration, for example, concurrently executes a first of the plurality of blocks of the programming code and a second of the plurality of blocks of the programming code, while the "AFTER PREVIOUS" configuration serially executes the second of the plurality of blocks of the programming code after the execution of the first of the plurality of blocks of the programming code. As such, simple representations within the graphical view provides various interconnections and flow of the programming code in a manner that may be easily understood by the user.

In one example, the plurality of icons are further selectively configured to provide a selectable delay, wherein the "AFTER PREVIOUS" configuration serially executes the second of the plurality of blocks of the programming code after the execution of the first of the plurality of blocks of the programming code and the selectable delay. In another example, the "AFTER PREVIOUS" configuration serially executes the second of the plurality of blocks of the programming code after a completion of the execution of the first of the plurality of blocks of the programming code and the predetermined delay.

In another example, the configuration of the plurality of icons comprises the selection of one or more options presented to the user, wherein the one or more options are selected from the group consisting of a port associated with the programming object, a condition of the programming object, a nature of an action of the programming object, a start time of the action, and a duration of the action. The programming object, for example, comprises one or more of a sensing object and an acting object. The sensing object may comprise one or more of a proximity sensor, a video sensor, and an audio sensor, and the acting object may comprise one or more of a motor, a visual device, an audio device, an LED, and a buzzer.

The one or more options presented to the user may further comprise one or more conditional commands associated with the programming object. For example, the one or more conditional commands may be based on the nature of the action of the sensing object, the port associated with the sensing object, the condition of the sensing object, a signal level condition of the sensing object, and a response of a dependent acting object to the condition of the sensing object. The response of the dependent acting object, for example, may comprise an action of the acting object that occurs concurrent with the condition of the sensing object or after a change in the condition of the sensing object occurs.

The one or more conditional commands, for example, may comprise one or more of an "IF" command and a "WHILE" command. The one or more conditional commands, for example, are associated with the programming object execute the acting object for as long as a status of the conditional command holds true when the respective conditional command comprises the "WHILE" command. Further, when the respective conditional command comprises the "IF" command, the acting object may be executed when the status of the conditional command changes, such as from true to false, or vice versa.

Accordingly, a student being taught robotics with no previous programming experience or skill, for example, will learn more effectively if the student is gradually introduced to the skill. The system and method presented in this disclosure is designed to guide the student through a multi-level approach to programming with software, starting from a practical and tangible level, and leading to an abstract and complex level.

For example, the multi-level approach to software programming comprises five levels, the first of which involves programming on a physical device (e.g., a physical toy robot) via manual operation of onboard buttons or other methods (e.g., a touch screen) which manually control outputs and/or inputs, whereby a program code is written automatically, based on the manual operations. The second level of software programming involves a simulator of the physical device incorporating the programming of first level, but instead of controlling outputs and/or inputs of a physical device, a simulated device is controlled. For example, instead of pressing physical buttons on a physical toy robot, virtual buttons are implemented to control a simulated toy robot.

The third level of software programming is a transition level, whereby the program code written in either of the first or second levels may be imported and be viewed in a graphical form (e.g., a sequence of visual objects, each visual object being a programming step) and in a text form (e.g., a sequence of commands corresponding to each visual object). In either graphical form or text form, functions and parameters of blocks of the program code may be visible and editable, thus providing the nexus to more advanced textual programming.

The fourth level of software programming is more advanced, wherein the program code may be composed in the graphical form and automatically converted to text form, whereby the program code is written automatically without the user viewing of either the physical device or simulated device. Again, in either of the graphical form or text form, the functions and parameters of the blocks of the program code may be visible and editable.

The fifth level of software programming is the culmination of software learning, whereby the program code is directly composed and edited in textual form (e.g., a sequence of textual commands corresponding to each graphical object). In all five levels, any or all of the graphical view, simulation view, and textual view may be presented on the display. However, by the time the user reaches the fifth level, the graphical view and/or simulation view may become redundant, and as such, the user has attained a high level of learning of software programming.

Accordingly, the robotics system, apparatus, and method provided in the present disclosure may be utilized to teach programming to the user in a friendly format, whereby programming knowledge is attained by the concurrent use of graphical, textual, and simulation views on the display. The learning of programming is thus efficient, user-friendly, and enjoyable, especially to a youth who is just beginning to learn the basics of programming.

Thus, to the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of a few of the various ways in which the principles of the disclosure may be employed. Other objects, advantages and novel features of the disclosure will become apparent from the following detailed description of the disclosure when considered in conjunction with the drawings.

DETAILED DESCRIPTION

Figure 1:
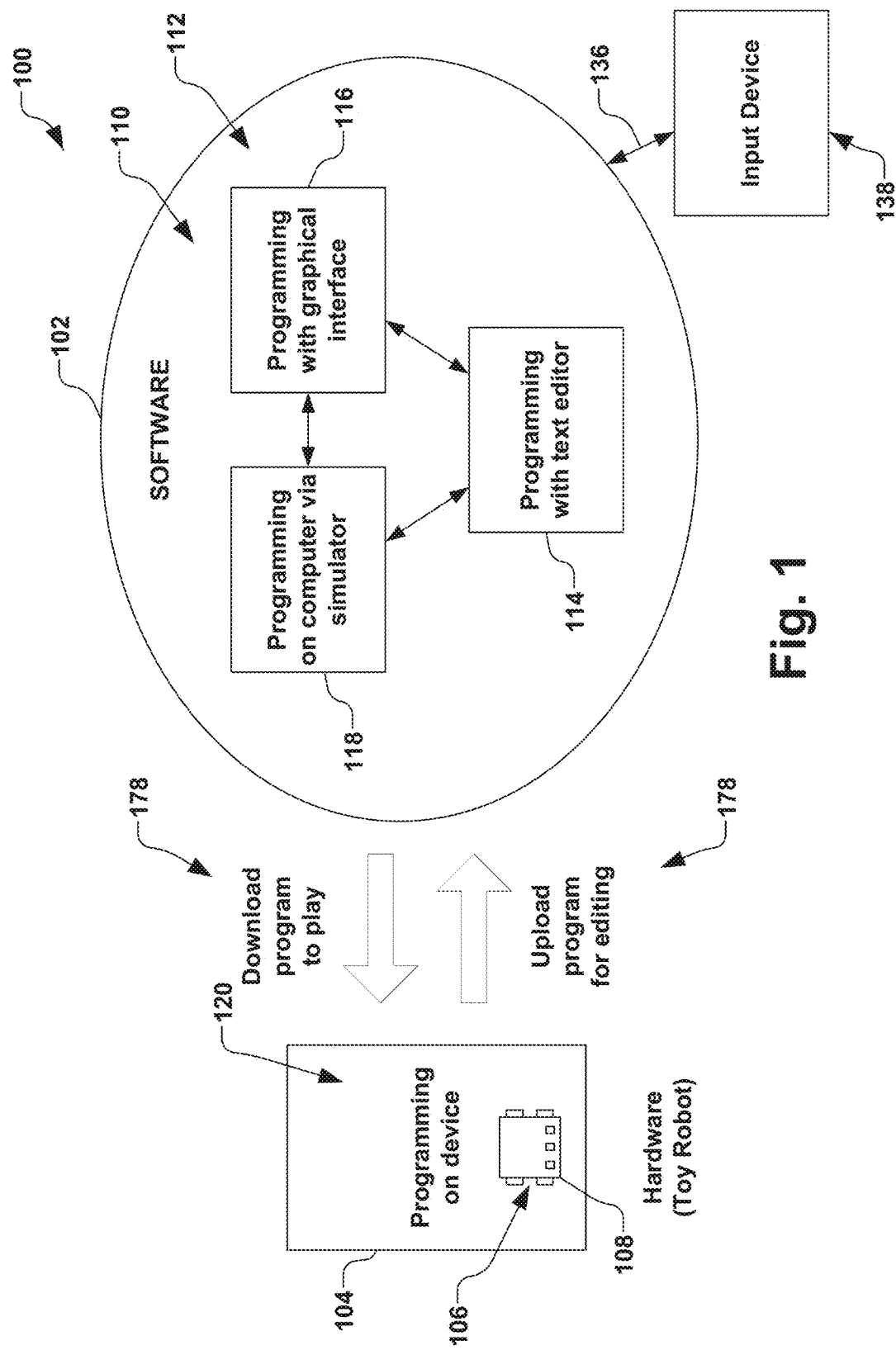
FIG. 1 is a block diagram illustrating various modes of programming as well as their interaction associated with various levels of competence and learning.
Figure 2:
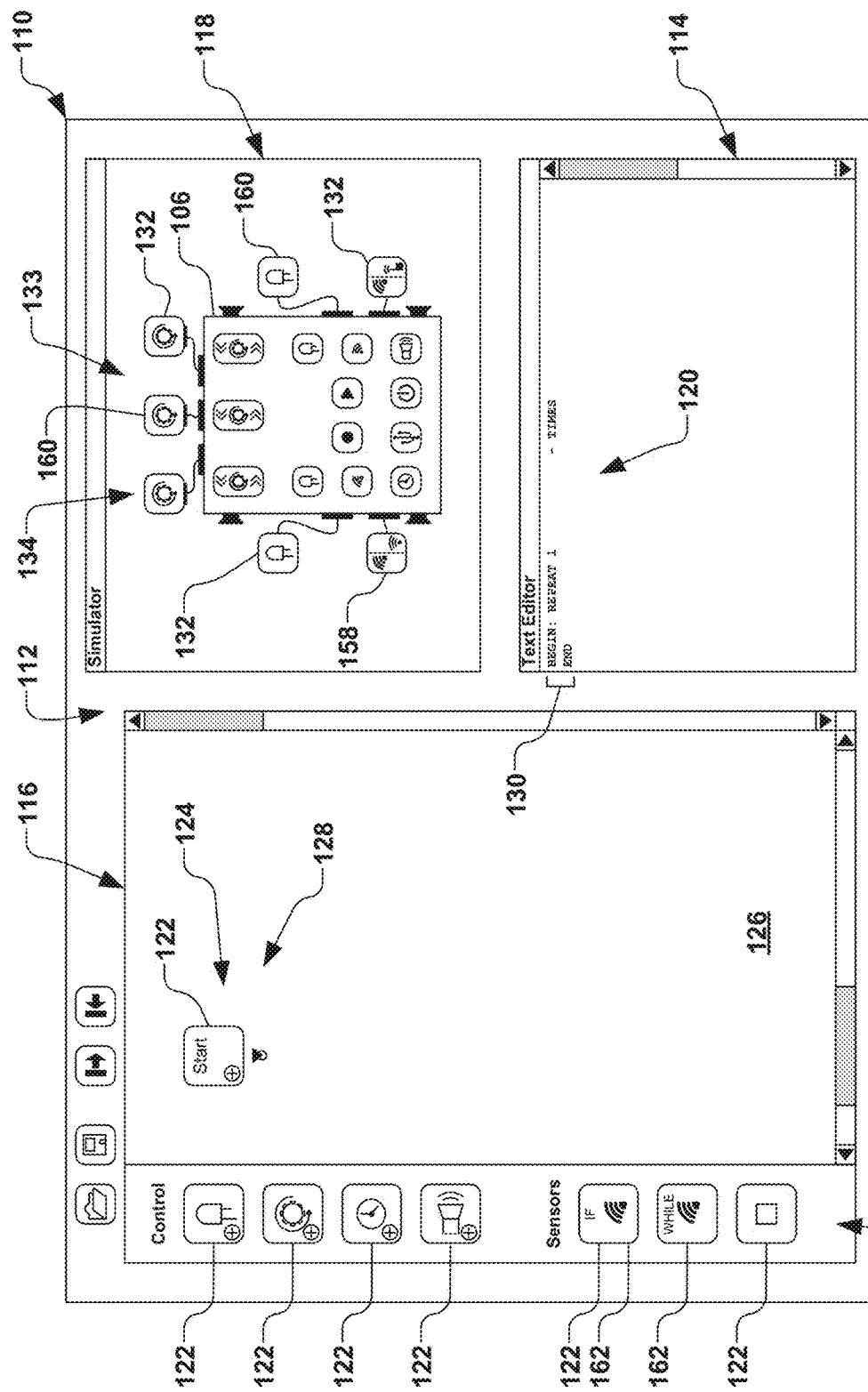
FIG. 2 illustrates an interface having a graphical view, a textual view, and a simulation view, where a first window is a visual programming window where icons are placed, with each icon representing a programming object the behavior of which can be defined.

The present disclosure is directed generally toward a system, apparatus, and method for teaching a user programming concepts through programming of a device. In one particular example, the disclosure is directed toward a system and method for teaching a child programming concepts through the programming of a toy robot. Accordingly, the present disclosure will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present disclosure. It will be evident to one skilled in the art, however, that the present disclosure may be practiced without these specific details.

It should be noted that while exemplary methods are illustrated and described herein as a series of acts or events, it will be appreciated that the present disclosure is not limited by the illustrated ordering of such acts or events, as some steps may occur in different orders and/or concurrently with other steps apart from that shown and described herein, in accordance with the disclosure. In addition, not all illustrated steps may be required to implement a methodology in accordance with the present disclosure. Moreover, it will be appreciated that the methods may be implemented in association with the systems illustrated and described herein as well as in association with other systems not illustrated.

Robotic toys (e.g., toy robots) may be used as a tool to teach computer programming to children because they are physical devices that allow children to see the results of their programming in the real world. The present disclosure teaches programming to a child or novice computer programmer by advantageously involving a visual representation of the behavior of the device so that the child can easily understand the effect of a programming action. The visual representation, for example, may comprise a window on a computer screen in the form of a simulator. The simulator allows the child to change the program and see the change of accompanying behavior through the simulator in order to develop the program, thus making the program more efficient.

The present disclosure presently appreciates a need to provide children and novice programmers with a framework that enables the execution of the function of more advanced concepts such as program loops in a simple manner. The present disclosure thus provides advanced programming via a simple representation.

When programming a robot for example, a physical device needs to be able to execute the program produced. If, however, the components which the program seeks to control do not match the configuration of the physical device, the program will not be able to properly execute. The present disclosure further appreciates a need for a system that provides relevant choices, showing irrelevant choices as invalid (e.g., grayed out), according to the configuration and the limitations of the hardware. For example, a motor may not be set to a sensor port, etc. By providing such a system, the present disclosure advantageously provides a novice programmer with relevant choices in order to efficiently program a device, while also teaching the novice programmer valuable programming skills.

Referring now to the Figures, in accordance with the present disclosure, a robotics system 100 for teaching concepts of computer programming to a user is illustrated in schematic form in FIG. 1. In one particular example, the user is a child or other person having little to no programming experience. The robotics system 100 of the present disclosure contains software 102 for providing a reference 104 to a device 106. The device 106, for example, is a robotic toy 108 in one or more of a physical form and a virtual form.

The software 102 of the present disclosure concurrently provides on a display 110 a plurality of views 112 associated with a programming of the device 106. The display 110, for example, is illustrated in further detail in FIGS. 2-8, and comprises one or more of a computer monitor, television, projection device, touch-screen, mobile phone display, and a handheld computing device. In accordance with the disclosure, the plurality of views 112 provided on the display 110 comprise two or more of a textual view 114, a graphical view 116, and a simulation view 118. The plurality of views 112, for example, may comprise individual "windows" on the display 110, the size of each window being adjustable as will be understood by one skilled in the art.

As illustrated in FIGS. 2-8, the textual view 114, for example, displays a programming code 120 for controlling the device 106 of FIG. 1, wherein the programming code is displayed as text. The graphical view 116 of FIGS. 2-8, for example, provides a plurality of icons 122, wherein the plurality of icons are configured to be selectively placed, interconnected, and modified in the form of a flow diagram 124 in a programming area 126 of the graphical view. A configuration 128 (e.g., placement location, feature set, etc.) of the plurality of icons 122, when placed in the programming area 126, respectively represents a plurality of blocks 130 of the programming code 120. Each of the plurality of blocks 130 of the programming code 120, for example, respectively corresponds to a behavior of a respective programming object 132 of the device 106, and the plurality of blocks 130 of the programming code 120 behave in a specific manner and in relation to one another based on the configuration 128 of the plurality of icons 122.

In one example illustrated in FIGS. 2-7, the simulation view 118 is configured to display a configuration 133 of the device 106 and a response 134 of the device to the programming code 120. The software 102 of FIG. 1 is further configured to accept input 136 from an input device 138 by the user for modifying one or more of the programming code 120 in the textual view 118 of FIGS. 2-8, the icons 122 and selective interconnection thereof in the graphical view 116, and the configuration 133 of the device 106 in the simulation view 118 of FIGS. 2-7. The input device 138 of FIG. 1, for example, comprises one or more of a keyboard, mouse, touch-screen, mobile phone, handheld computing device, and an auditory input device. In one example, one or more of the plurality of icons 122 of FIGS. 2-8 are placed in the programming area 126 of the graphical view 116 by one or more of a drag and drop operation from an icon bar 140, a double-click-and-select operation from the icon bar, and a selection action performed in the programming area of the graphical view. In another example, a selection of one or more plurality of icons 122 from the icon bar 140 by the user creates an association to the respective programming object 132 in the graphical programming area 126.

Accordingly, the input 136 of FIG. 1 provided by the user is configured to modify the programming code 120 of the device 106. For example, the plurality of views 112 of FIGS. 2-8 are updated and synchronized after the modification of one or more of the programming code 120, the plurality of icons 122, and the configuration 132 of the device 106 in any of the plurality of views. The plurality of views 112, for example, are configured to be updated and synchronized manually, automatically, or after a predefined pause after said modification. For example, the textual view 114, graphical view 116, and simulation view 118 may be synchronized such that they all represent the same information, but in different formats. Automatic synchronization, for example, may occur immediately after an input into any one of the plurality of views 112 by the user, or the synchronization may be set to occur with a predetermined pause after said input. Manual synchronization of the plurality of views 112 may be further provided in order to enable the development of the programming code 120 to a certain stage before a subsequent representation may be viewed. Such synchronization may benefit children as they develop their programming skills and competence. The user, for example, may further select between manual synchronization and automatic synchronization.

Further, any of the plurality of views 112 may be modified, whereby the remainder of the plurality of views are accordingly updated and synchronized. As such, the user may view the programming code 120 in the textual view 114 in response to modifying the graphical view 116 and/or simulation view 118, and accordingly learn and progress to more advanced modifications of the programming code directly within the textual view. Further, the plurality of views 112 may be reset to a previous state after being updated and synchronized upon a request by the user. Once the programming code 120 is modified through the textual view 114 and/or graphical view 116, the user may notice that the modification did not produce the desired operation or effect in the simulation view 118. By being provided the opportunity to reset the plurality of views 112 to a previous state, that the modification may be removed, thus enabling the user to try a different modification of the programming code.

Figure 3:
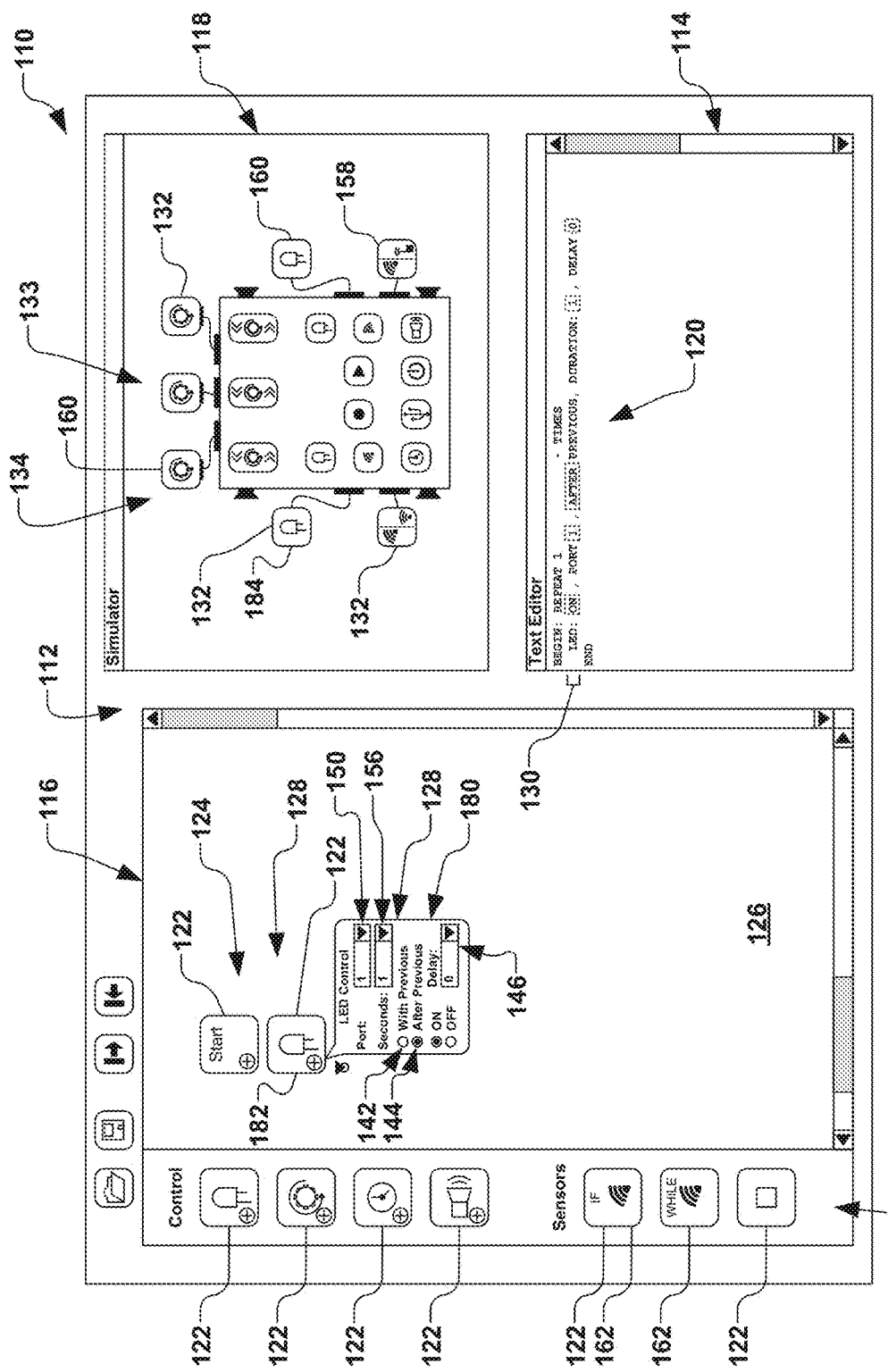
FIG. 3 illustrates a programming object placed in a graphic area and the behavior of this programming object being defined through a setup window that presents relevant options.
Figure 5:
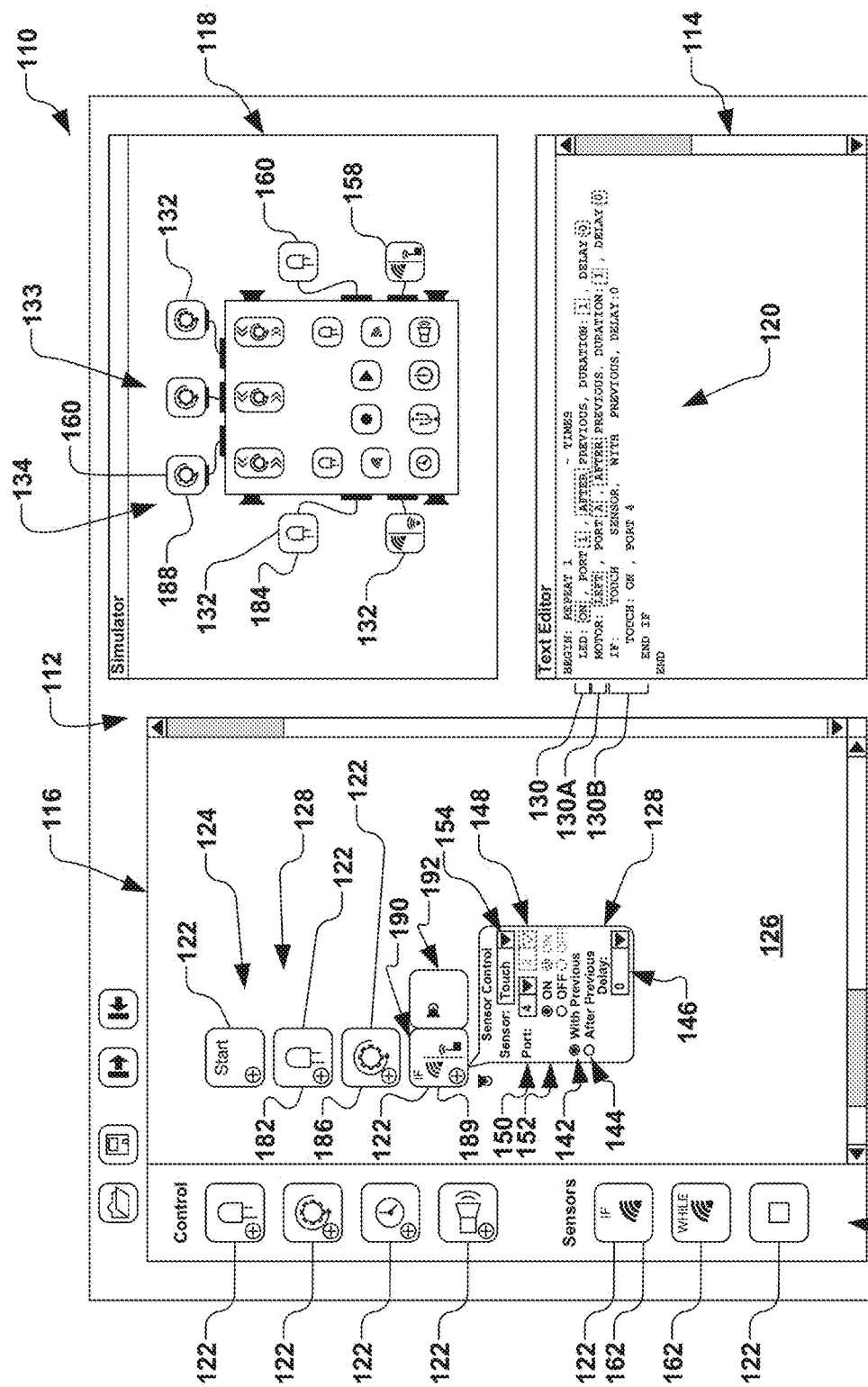
FIG. 5 illustrates a conditional command programming object with behavior of the conditional command being defined through a setup window.
Figure 6:
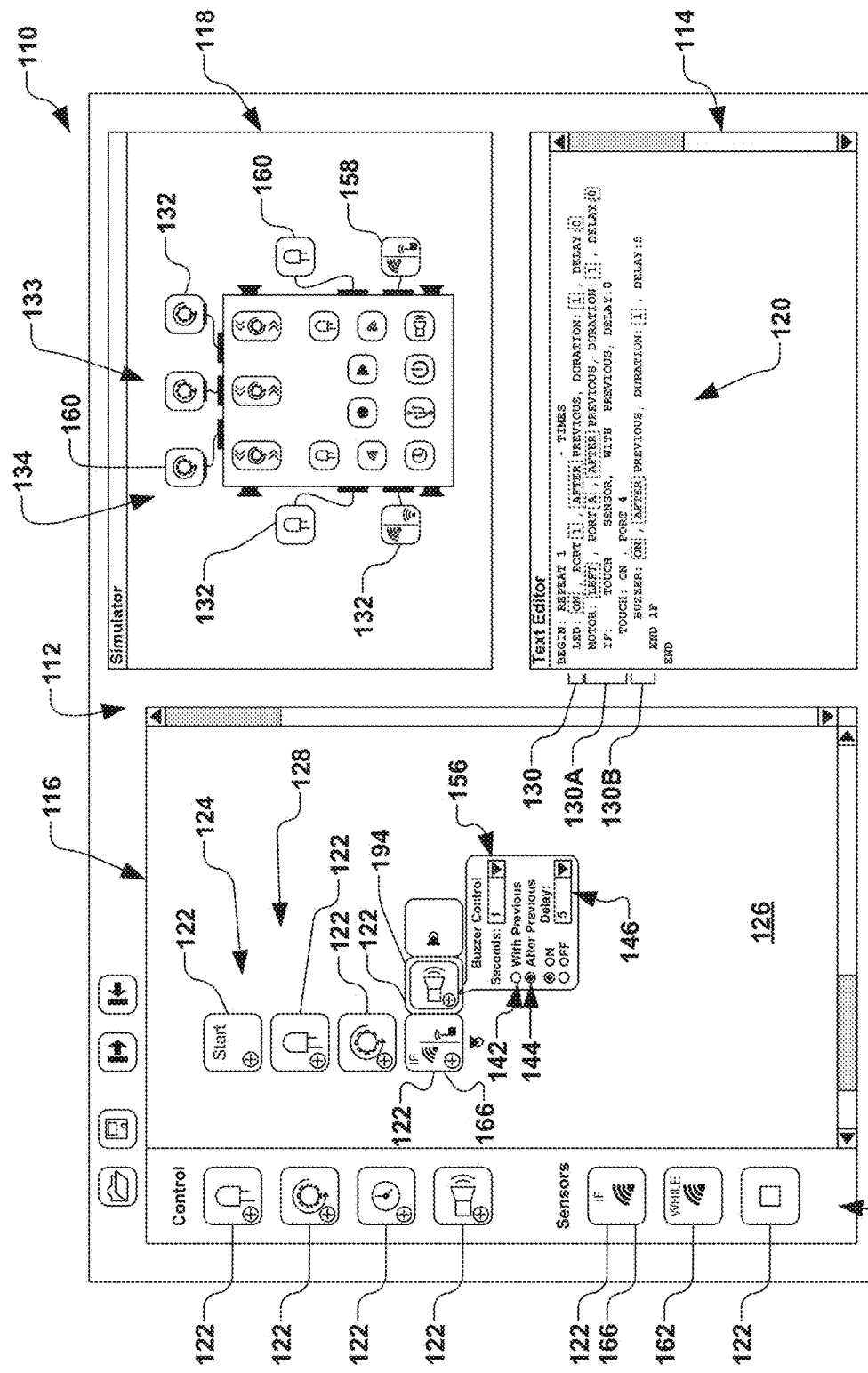
FIG. 6 illustrates a conditional command programming object with another programming object that refers to an acting object being placed inside the conditional command window and the behavior of this programming object now being defined through its own setup window.

In accordance with another exemplary aspect of the disclosure, the plurality of icons 122 provided within the graphical view 116 are selectively configured as one of a "WITH PREVIOUS" configuration 142 and an "AFTER PREVIOUS" configuration 144, as illustrated in the example shown in FIG. 3. The "WITH PREVIOUS" configuration 142, as illustrated in FIG. 5, for example, concurrently executes a first 130A of the plurality of blocks 130 of the programming code 120 and a second 130B of the plurality of blocks of the programming code. As illustrated in the example of FIG. 6, the "AFTER PREVIOUS" configuration 144 serially executes the second 130B of the plurality of blocks 130 of the programming code 120 after the execution of the first 130A of the plurality of blocks of the programming code. As such, simple terminology within the graphical view 116 provides various interconnections and flow of the programming code 120 in a manner that may be easily understood by the user. It is further noted that the plurality of blocks 130 may be nested or configured in a manner as will be apparent to one skilled in the art upon viewing the present disclosure.

In one example illustrated in FIG. 6, the plurality of icons 122 are further selectively configured to provide a selectable delay 146, wherein the "AFTER PREVIOUS" configuration 144 serially executes the second 130B of the plurality of blocks 130 of the programming code 120 after the execution of the first 130A of the plurality of blocks of the programming code and the selectable delay (e.g., 5 seconds in the example illustrated in FIG. 6). In another example, the "AFTER PREVIOUS" configuration 144 serially executes the second 130B of the plurality of blocks 130 of the programming code 120 after a completion of the execution of the first of the plurality of blocks of the programming code and the predetermined delay.

In accordance with another example, the configuration 128 of the plurality of icons 122 comprises the selection of one or more options 148 presented to the user, as illustrated in the example of FIG. 5. The one or more options 148, for example, may be in the form of an icon 122 and comprise a selection of a port 150 associated with the programming object 132, a condition 152 of the programming object (e.g., ON, OFF, and/or signal level condition), a nature of an action 154 of the programming object, a start time of the action (e.g., the selectable delay 146), and a duration of the action 156, as illustrated in the example of FIG. 6.

The icon bar 140 of the graphical view 116, for example, holds a collection of icons 122, each representing respective programming objects 132. Each programming object 132, for example, comprises one or more of a sensing object 158 and an acting object 160. The sensing object 158 controls a sensing element and may comprise one or more of a proximity sensor, a video sensor, and an audio sensor, and the acting object 160 controls an acting element and may comprise one or more of a motor, a visual device, an audio device, an LED, and a buzzer. Various other types of sensing objects 158 and acting objects 160 are also contemplated, and one of ordinary skill will understand such sensing objects and acting objects to fall within the scope of the present disclosure.

Figure 7:
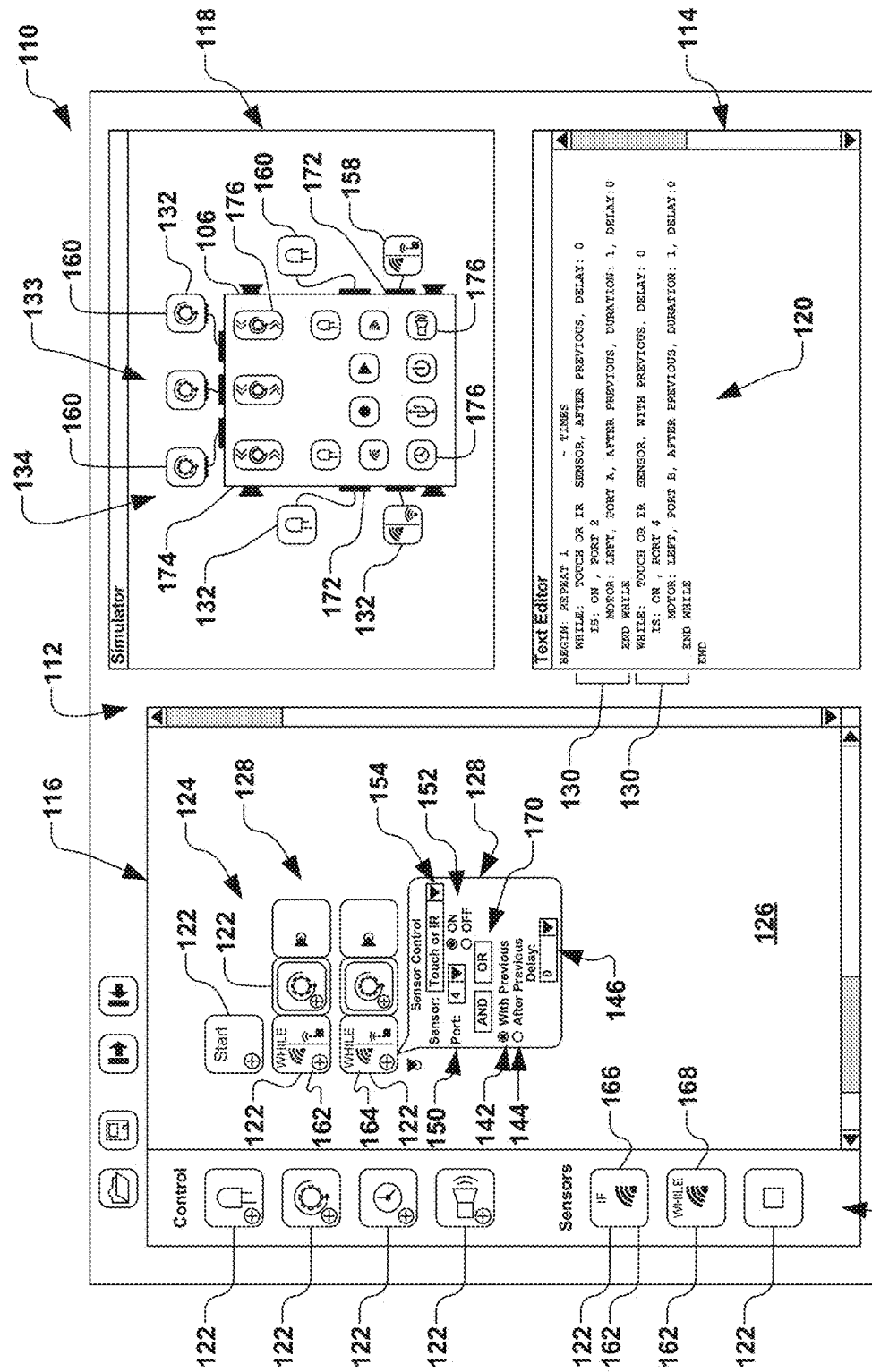
FIG. 7 illustrates two conditional commands in sequence, with logical AND or logical OR relationship between them defined, wherein FIG. 6 also illustrates an example program for a robot following a line on the floor where the functionality is achieved in a simple and intuitive manner as compared to conventional multiple loops of different commands.

The one or more options 148 presented to the user may be presented as one of the plurality of icons 122 in the icon bar 140 as a conditional icon 162. The one or more options 148 associated with the conditional icon 162, for example, further comprise one or more conditional commands 164 associated with the programming object 132, as illustrated in FIG. 7. For example, the one or more conditional commands 164 may be based on the nature of the action 154 of the sensing object 158, the port 150 associated with the sensing object, the condition 152 of the sensing object, such as a signal level condition of the sensing object, and a response of a dependent acting object to the condition of the sensing object. The response of the dependent acting object, for example, may comprise an action of the acting object that occurs concurrent with the condition of the sensing object or after a change in the condition of the sensing object occurs.

The one or more conditional commands 164, for example, may comprise one or more of an "IF" command 166 and a "WHILE" command 168. The one or more conditional commands 164 associated with the programming object 132, for example, execute the acting object 160 for as long as a status of the respective conditional command holds true when the respective conditional command comprises the "WHILE" command 168. For example, while the condition 152 of the sensing object 158 is "ON", the "WHILE" command generally defines an infinite loop until the condition of the sensing object changes to "OFF". In other words, the "WHILE" command 168 checks if a sensor object 158 is ON, OFF, or has reached a predetermined value and executes the encompassed programming object 132 while the sensor satisfies the criteria. Further, when the respective conditional command 164 comprises the "IF" command 166, as illustrated in FIG. 6, the acting object 132 may be executed when the status of the conditional command changes, such as from true to false, or vice versa. For example, the "IF" command 166 operates once the condition 152 is satisfied. The "IF" command checks if a sensor is ON, OFF, or has reached a predetermined value and executes the encompassed programming object once the sensor satisfies the criteria.

The one or more conditional commands 164 operate like encompassing commands. In graphical view 116, for example, the user can drop various programming objects 132 into the icons 122 representing the conditional commands 164. Visually, the icon 122 representing the conditional command 164 expands to allow one or more of the programming objects 132 to be placed therein, thus nesting the conditional command. The incorporation of the WITH PREVIOUS" configuration 142 and "AFTER PREVIOUS" configuration 144 greatly simplifies the program structure, thus not necessitating a loop to be inserted within another loop. Further, the one or more conditional commands 164 may relate to previous conditional commands through a logical AND or logical OR relationship 170 illustrated in FIG. 7. With the incorporation of the "WITH PREVIOUS" configuration 144 in the one or more conditional commands 164, the programming code 120 will check if the condition is met while the other acting objects 160 and sensing objects 158 associated with the same "WITH PREVIOUS" configuration are running in parallel. In effect, this automatically creates loops within loops that operate as a "black box" for the younger user building a seemingly simple program.

In accordance with another exemplary aspect, the simulation view 118 provides a virtual representation of the configuration of the device 106 such as a toy robot, wherein the acting objects 160 and sensing objects 158 are connected to various ports 172, as illustrated in the example of FIG. 7. The simulation view 118, for example, provides a simulated device 174 that not only permits configuration of outputs and/or inputs to the ports 172 that relevant to the respective outputs and/or inputs, but also comprises a plurality of buttons 176 configured to activate the ports or perform other functions. The user, for example, may program the simulated device 174 in the simulation view 118 by pressing the buttons 176 as they would if they were programming a physical device. Thus, such intuitive programming creates a series of commands which may be automatically translated into the flow diagram 124 (e.g., plurality of icons 122) in the graphical view 116 and into the programming code 120 in the textual view 114.

In one example, each of the plurality of buttons 176, for example, includes parameters such as port number, port type, duration (e.g., time of activation), and sequence. This type of programming is considered a first level of software programming, as it replicates the physical process to program the physical device. However, the construction of the programming code in the graphical view 116 and textual view 114 (e.g., more abstract forms of programming) leads to a smooth transition from the physical world to abstract methods of programming. In addition, the concurrent display of the programming code 120 in the textual view 114 and flow diagram 124 in the graphical view 116 leads to greater comprehension and subsequent editing of the programming code. The selection of a programming object 132 for placement into the programming area 126 can also be done by a selection process on the simulator view 118, such as a double clicking or right click of the mouse.

At a more advanced levels of programming, the user may manually program the device 106 of FIG. 1 and subsequently import the programming code 120 from the device to the software 102 for review and/or editing. In order to edit the programming code 120, the various parameters are displayed in the textual view 114 of FIGS. 2-8. The present disclosure thus links the physical device 106 with the programming code 120 in both directions 178 (e.g., from the physical device to a computer holding the programming code and from the computer to the physical device).

Advanced levels of programming further provide for the creation of a flow of commands via the flow diagram 124 in the graphical view 116 of FIGS. 2-7. The graphical view 116 provides simple and intuitive construction of the programming to control the device 106. The flow diagram 124 is thus translated into the programming code 120 displayed in the textual view 114. The textual view 114 thus allows the user, once they become more familiar with the principles of computer programming, to edit the programming code 120 and/or generate the programming code directly from the textual view.

Examples of the system 100 and operation thereof are further provided hereafter for a better understanding of the disclosure. FIG. 3, for example, shows a configuration 128 (e.g., through a definition window 180) of an LED icon 182 relating to a programming object 132. The programming object 132 relates to an acting object 160 (e.g., a light emitting diode or LED), and the icon 122 represents a schematic of an LED. The definition window 180 of the programming object 132 shows the selection of port 150, duration of action 156, delay 146, as well as the relationship to previous icon 122 with the "AFTER PREVIOUS" configuration 144 selected. The placement and configuration of the LED icon 182 in the programming area 126 is thus translated into programming code 120 (e.g., pseudo-code) and is displayed in the textual view 114. The simulation view 118 may further simulate the execution of the programming code 120 by showing the selected objects, at the defined port, in operation. For example, an LED 184 turns ON in the simulation view 118.

Figure 4:
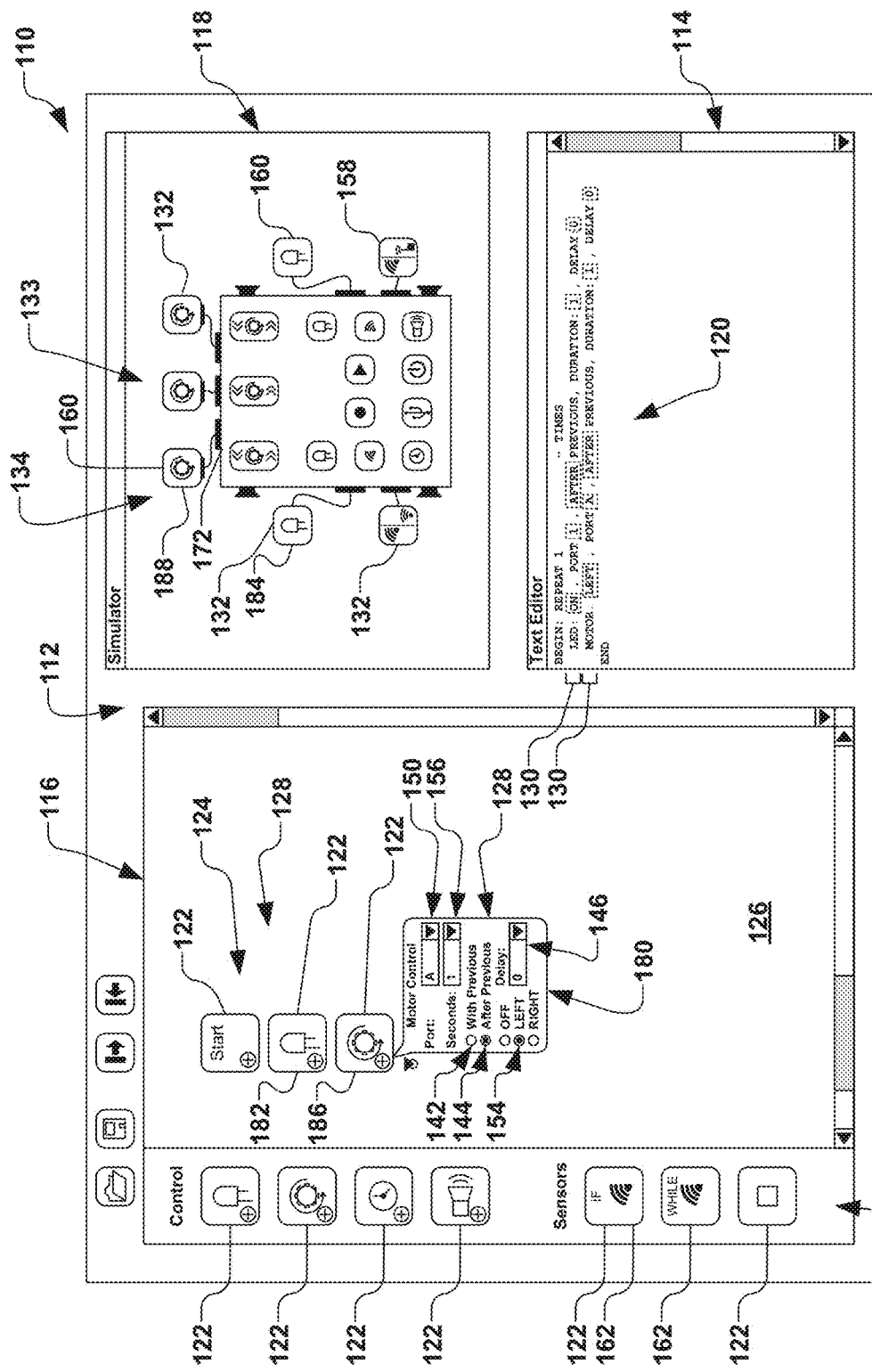
FIG. 4 illustrates two programming objects in a sequence, where behavior of the second programming object is defined in relation to the previous programming object through a selection of "WITH PREVIOUS" or "AFTER PREVIOUS" behavior.

FIG. 4 illustrates the addition of a motor icon 186 another acting object 160 (e.g., a motor 188), wherein the definition window 180 of the programming object 132 shows the selection of port 150, nature of action 154 (e.g., rotate LEFT) duration of action 156, delay 146, as well as the relationship to previous icon 122 with the "AFTER PREVIOUS" configuration 144 selected. The placement and configuration of the motor icon 186 in the programming area 126 is thus translated into programming code 120 and is further displayed in the textual view 114. The simulation view 118 may further simulate the execution of the programming code 120 by showing the selected objects, at the defined port, in operation. For example, an LED 184 turns ON and the motor 188 turns LEFT in the simulation view 118.

The plurality of views 112, may be further synchronized (e.g., immediately or with a predetermined delay) after a change is made in any of the plurality of views. As stated previously, the synchronization may be automatic or manual in order to enable the user to implement a change in one of the plurality of views 112 and see the effect in another. For example the user can produce programming code 120 using visual programming in the graphical view 116 and see and edit the pseudo-code in the textual view 114, or see a simulation of the operation in the simulation view 118.

In accordance with another example, depending on the programming object 132 that is selected corresponding to a respective hardware component, the user is given hardware relevant options in the definition window 180 of the respective icon 122. Selection of the nature of action 154 as LEFT or RIGHT means that the motor 188 will turn clockwise or anti-clockwise respectively. The ports 172 available for selection are only the ports where the corresponding programming object 132 can be connected at the hardware level. Thus, for the motor 188 shown in FIG. 4, the ports 172 presented for selection are only ports A, B or C in contrast to the example shown in FIG. 3 where the LED 184 can be connected to ports 1, 2, 3, or 4. The ports 172 of FIG. 4 are visually shown in the simulation view 118 so that the user can quickly see the arrangement of the ports. In the definition window 180 associated with the motor icon 186, the nature of action provides options LEFT, RIGHT, and OFF, as opposed to the ON and OFF options for the LED icon 182 in FIG. 3.

FIG. 5 shows an example of an all-encompassing conditional command 189. Conditional commands 162 are described as all-encompassing conditional commands 189 because there may be a number of programming objects 132 under the control of the conditional command 162. This is achieved in the graphical view 116 by an icon 122 that has a drop-in area 190 for other programming objects 132, whereby the drop-in area expands as a programming object is placed therein, so as to provide additional space 192 for another programming object to be dropped in. Conditional commands 162 relate to sensing objects 158, such as a sensor. The definition window 180 of a conditional command 162 enables the user to define the type of sensor (nature of action 154), the port 150, delay 146, and the relationship to previous icon 122 with the "WITH PREVIOUS" configuration 142 selected. The example shown in FIG. 5 refers to a touch sensor.

When a programming object 132 is dropped into a conditional command 162, the user is prompted to define that programming object as normal. The example shown in FIG. 6 represents a programming object 132 corresponding to a physical object of a buzzer 194, within the encompassing IF command 166. In this example, the programming object 132 has an integrated buzzer rather than an externally connected buzzer, so no port is available for selection. The definition is therefore a selection of duration of action 156 and the relationship to previous icon 122 with the "AFTER PREVIOUS" configuration 144 selected. The textual view 118 shows the IF command defined as a touch sensor, to operate in parallel with previous programming object at port 4 whereby the buzzer will be ON for 1 second, after the touch sensor is activated. The syntax of the pseudo-code in the textual view 118 is easy to understand and follow, as it uses the same simple words that are used in the definition of the programming objects in the visual programming area.

Conditional commands 162 may be further arranged in a sequence. FIG. 7 shows an example whereby a WHILE command 168 is placed in sequence following another WHILE command 168. The relationship to previous "WITH PREVIOUS" configuration 142 or "AFTER PREVIOUS" configuration 144 also applies to a sequence of conditional commands 162. Two conditional commands 162 in sequence, for example, may be linked through a logical OR or a logical AND connections. This defines the behavior if either or both sensors satisfy the criteria.

Figure 8:
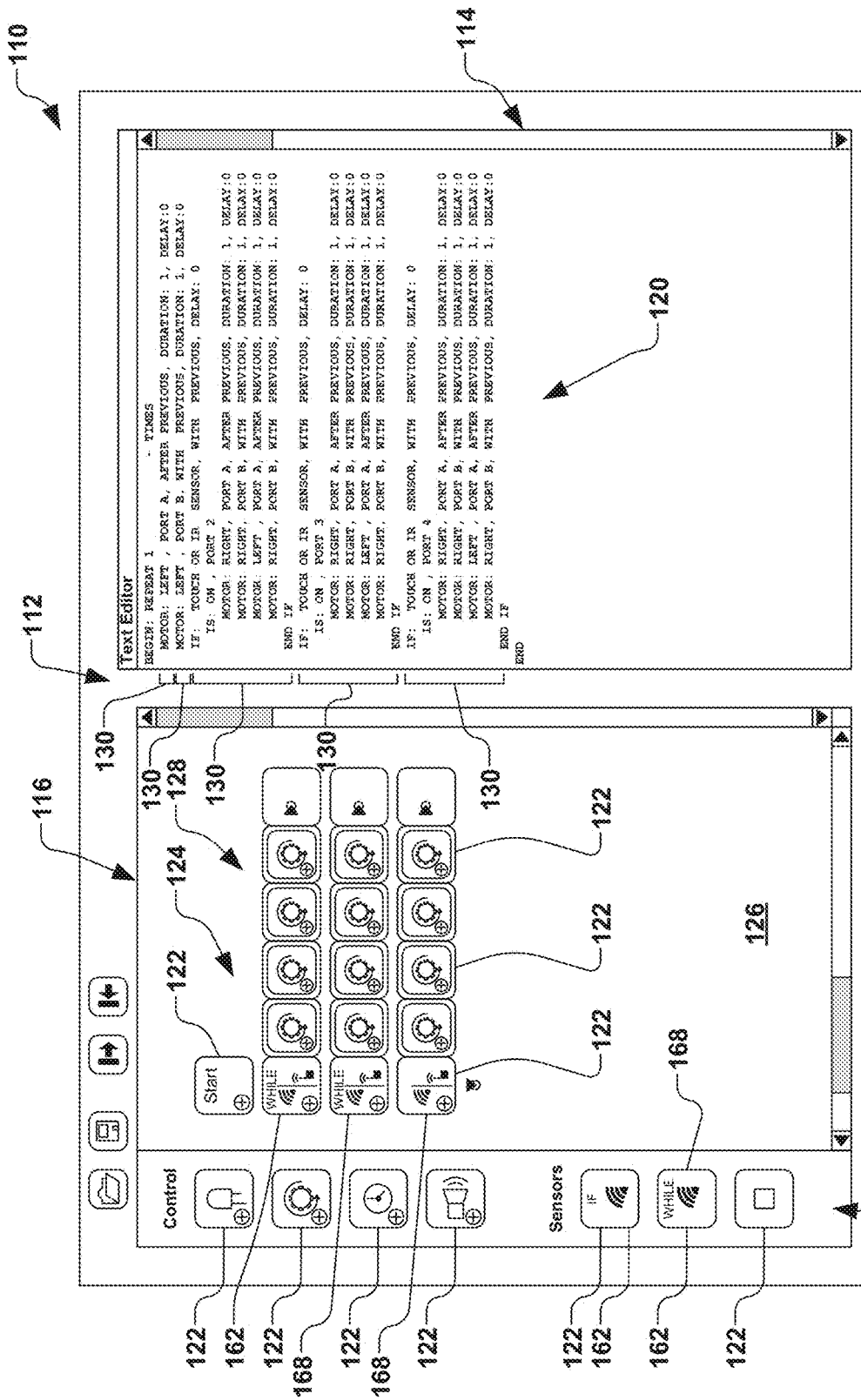
FIG. 8 illustrates an example program for a robot avoiding an obstacle.

FIG. 8 illustrates the ease by which a complex operation can be defined using the system 100 disclosed by the present disclosure. The example shown in FIG. 8 refers to a program for a robot to follow a line on the floor. In the example of FIG. 8, it is noted that of the plurality of views 112 are limited to the graphical view 116 and the textual view 114, wherein the simulation of the operation in the simulation view 118 of FIGS. 1-7 is not provided on the display 110. As the user gains more advanced programming skills, such an absence of the simulation view 118 can provide additional space for viewing the programming code 120 and/or the flow diagram 124.

In the example of FIG. 8, the programming code 120 is configured to guide a vehicle along a black line on a floor (not shown). Sensor 2 (e.g., infrared light) is on the left of the line and sensor 4 (e.g., infrared light) is on the right side of the line. Both sensors 2 and 4 reflect light and move motors A and B in parallel. When either sensor senses the black line, there is no reflection of light back to the respective sensor and the corresponding motor stops turning (e.g., while the other motor still turns), thus causing the vehicle to turn in the right direction (e.g., following the line). The textual view 114 illustrates the simplicity of the pseudo-code which achieves this operation through two WHILE commands in sequence. Conventional programming methods would typically have multiple loops which children or novice programmers would find difficult to understand and/or construct.

This present disclosure greatly simplifies programming when a number of elements are operated at the same time, as the user does not need to be concerned with the order. In addition, the present disclosure reduces the number of objects typically needed to represent the flow of commands. For example, a method may state, "motor 1 on", then, "motor 2 on", and then, "wait for x time" to denote a parallel behavior for a duration of time, followed by "motor 1 off" and "motor 2 off" to terminate the behavior. Such a method has five programming steps, whereas the system 100 of the present disclosure can perform the desired functions in two programming steps; namely, "motor 1 on" and "motor 2 on WITH PREVIOUS", wherein the operation time of the function(s) is an integrally defined variable within each step. As the program becomes more complex with more steps, the reduction in programming steps becomes even more evident, making programming easier for children or people with no extensive experience with programming.

Figure 9:
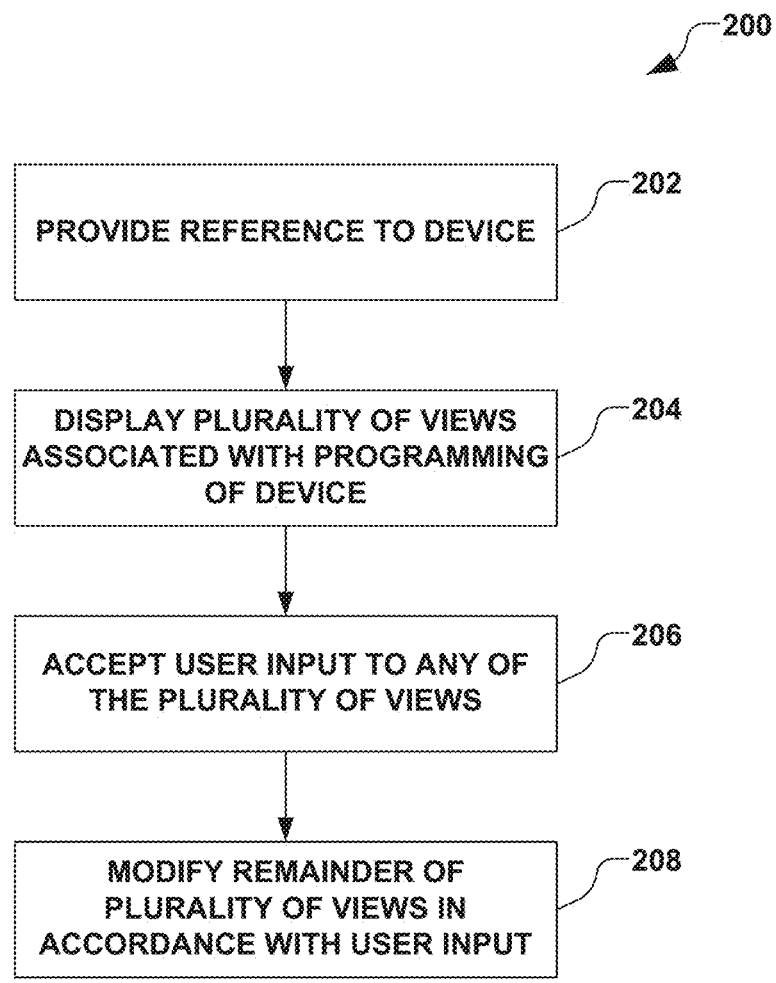
FIG. 9 illustrates and exemplary method for teaching programming to a user.

FIG. 9 illustrates a simplified exemplary method 200 for teaching programming to a novice user, wherein the method 200 may be implemented using the system 100 of FIGS. 1-8. The method 200 begins with providing a reference to a device in act 202. In act 204, a plurality of views is displayed, wherein the plurality of views are associated with the programming of the device. In act 206, input from the user is accepted to any of the plurality of views, wherein in act 208, the remainder of the plurality of views are modified in accordance with the input from the user.

Figure 10:
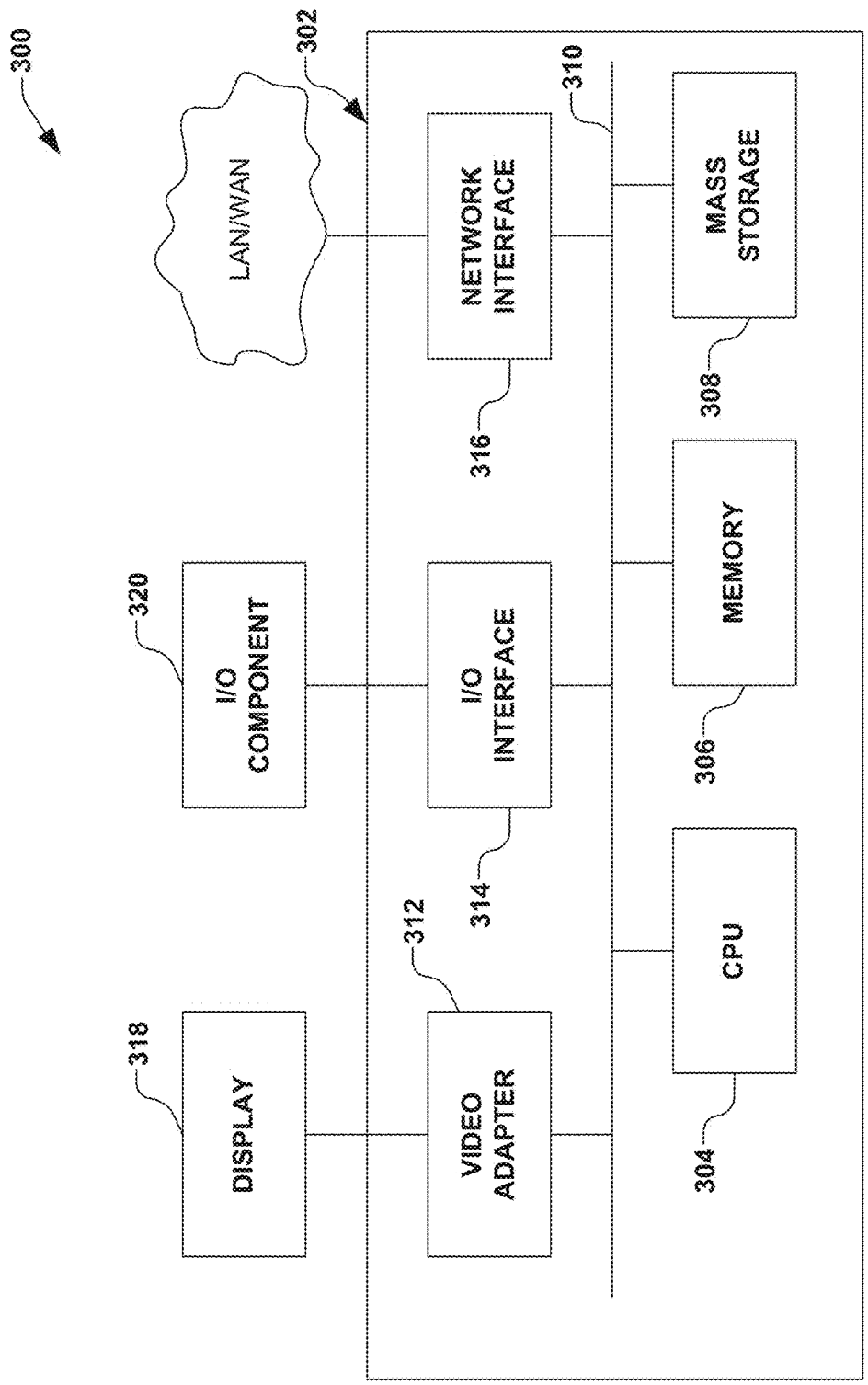
FIG. 10 illustrates and exemplary processor based system operable to perform various functions of the present disclosure.

In accordance with another aspect, the aforementioned system and methodology may be implemented using computer program code in one or more general purpose computer or processor based system. As illustrated in FIG. 10, a block diagram is provided of a processor based system 300 is provided in accordance with another embodiment. The processor based system 300 is a general purpose computer platform and may be used to implement processes discussed herein. The processor based system 300 may comprise a processing unit 302, such as a desktop computer, a workstation, a laptop computer, or a dedicated unit customized for a particular application. The processor based system 300 may be equipped with a display 318 and one or more input/output devices 320, such as a mouse, a keyboard, or printer. The processing unit 302 may include a central processing unit (CPU) 304, memory 306, a storage device 308, video adapter 312, and an I/O interface 314 connected to bus 310.

The bus 310 may be one or more of any type of several bus architectures including a memory bus or memory controller, a peripheral bus, or video bus. The CPU 304 may comprise any type of electronic data processor, and the memory 306 may comprise any type of system memory, such as static random access memory (SRAM), dynamic random access memory (DRAM), or read-only memory (ROM).

The mass storage device 308 may comprise any type of storage device configured to store data, programs, and other information and to make the data, programs, and other information accessible via the bus 310. The mass storage device 308 may comprise, for example, one or more of a hard disk drive, a magnetic disk drive, or an optical disk drive.

The video adapter 312 and the I/O interface 314 provide interfaces to couple external input and output devices to the processing unit 302. Examples of input and output devices include the display 318 coupled to the video adapter 312 and the I/O device 320, such as a mouse, keyboard, printer, and the like, coupled to the I/O interface 314. Other devices may be coupled to the processing unit 302, and additional or fewer interface cards may be utilized. For example, a serial interface card (not shown) may be used to provide a serial interface for a printer. The processing unit 302 also may include a network interface 316 that may be a wired link to a local area network (LAN) or a wide area network (WAN) 322 and/or a wireless link.

It should be noted that the processor based system 300 may include other components. For example, the processor based system 300 may include power supplies, cables, a motherboard, removable storage media, cases, and the like. These other components, although not shown, are considered part of the processor based system 300. Embodiments of the present disclosure may be implemented on the processor based system 300, such as by program code executed by the CPU 304. Various systems and methods according to the above-described embodiments, such as those described with respect to FIGS. 1-9, may be further implemented by program code. Accordingly, explicit discussion herein is omitted.

Further, it should be noted that the modules and devices in FIG. 1 may all be implemented on one or more processor based systems 300 of FIG. 10. Communication between the different modules and devices may vary depending upon how the modules are implemented. If the modules are implemented on one processor based system 300, data may be saved in memory 306 or mass storage 308 between the execution of program code for different steps by the CPU 304. The data may then be provided by the CPU 304 accessing the memory 306 or mass storage 308 via bus 310 during the execution of a respective step. If modules are implemented on different processor based systems 300 or if data is to be provided from another storage system, such as a separate database, data can be provided between the systems 300 through I/O interface 314 or network interface 316. Similarly, data provided by the devices or stages may be input into one or more processor based system 300 by the I/O interface 314 or network interface 316. A person having ordinary skill in the art will readily understand other variations and modifications in implementing systems and methods that are contemplated within the scope of varying embodiments.

Example 1

A method of teaching concepts of computer programming to a user comprises providing a reference to a device, and concurrently displaying a plurality of views associated with a programming of the device, the plurality of views comprising two or more of a text view of programming code, a flow diagram view having a plurality of visual entities, and a simulation view. Each of the plurality of visual entities represents a respective block of the programming code, and are configured to be selected and connected to one another in the form of a flow diagram displayed in the flow diagram view. The simulation view is configured to display a configuration of the device and a response of the device to the code. The method further comprises modifying one or more components by the user of any of the plurality of views, therein modifying the programming of the device. The device may comprise a physical hardware device and/or a virtual hardware device, such as a robotic toy.

The plurality of views, for example, may be updated and synchronized after the modification of the one or more components of any of the plurality of view, wherein the plurality of views are updated and synchronized automatically, such as immediately or after a predefined pause. The plurality of views may also be updated and synchronized manually upon a direction provided by the user. In another example, each of the plurality of views is configured to be selectively synchronized to the modification of the one or more components of any of the other of the plurality of views.

In another example, each of the plurality of views is configured to be selectively reset to a previous status. The plurality of views, for example, are configured to be synchronously reset to a respective plurality of previous statuses, wherein the plurality of previous statuses are associated with a previous modification of the one or more components of the respective plurality of views. For example, the plurality of views are configured to be synchronously reset to the respective plurality of previous statuses in any of the plurality of views.

Example 2

An interface for teaching programming of a hardware device is provided, comprising an input device, a display; and a computer code provided in a computer, wherein the computer code is configured to concurrently display a plurality of windows on the display. The plurality of windows comprises two or more of a text window, a flow diagram window, and a simulation window. The text window is configured to display a program code for the programming of the hardware device, wherein the computer code is configured to receive and display input from the input device in the text window. The flow diagram window has a plurality of visual entities, wherein each of the plurality of visual entities represents a respective block of the program code, and wherein each of the plurality of visual entities are configured to be selected via the input device and selectively connected to one another in the form of a flow diagram displayed in the flow diagram window via the computer code. The computer code is configured to display a configuration of the device and a response of the device to a modification to the program code via the input device in the simulation window, wherein a modification of one or more components of any of the plurality of windows modifies the programming of the hardware device via the computer code.

In one example, the input device comprises one or more of a keyboard, mouse, touch-screen, mobile phone, handheld computing device, and an auditory input device. The display, for example, comprises one or more of a computer monitor, television, projection device, touch-screen, mobile phone display, and a handheld computing device. The hardware device, for example, comprises one or more of a physical hardware device and a virtual hardware device. The computer code, for example, is configured to update and synchronize the plurality of windows after the modification of the one or more components of any of the plurality of windows, such as automatically, after a predefined pause, and/or upon a direction provided by the user via the input device. In another example, the computer code is configured to update synchronously reset the plurality of windows to a respective plurality of previous statuses, wherein the plurality of previous statuses are associated with a previous modification of the one or more components of the respective plurality of views.

Example 3

An interface for programming a hardware device is provided comprising a display, a computer comprising software configured to display three or more windows on the display, and an input device. A size of each of the three or more windows is adjustable, wherein the three or more windows include at least a hardware device simulator window configured to display an image of the hardware device, a graphical programming window, and a text editor window. Information displayed in the three or more windows is linked to a core code entered through graphical programming or text inputted to the one or more of the graphical programming window and text editor window via the input device. A size of the hardware device simulator window, for example, is adjustable, wherein the image of the hardware device is automatically scaled to fit within the hardware device simulator window.

Example 4

A method for enabling children to create relational statements while learning programming comprises providing an interface window and creating relationships between objects in a visual manner in the interface window. A plurality of icons are provided, wherein each of the plurality of icons represents a respective block of programming code, wherein each of the plurality of icons is configured to be placed into a graphical programming area and connected in a flow diagram, therein forming relationships and dependencies between the plurality of icons, and wherein once each of the plurality of icons are respectively placed into the graphical programming area, the respective icon represents a programming object corresponding to a behavior of a hardware item of a hardware device, and wherein objects are configured to behave in a specific manner in relation to a previous object.

For example, the hardware device comprises a toy robot, wherein the hardware item comprises a first motor of the toy robot. The programming object, for example, may comprise one or more of a port on the hardware device, a nature of an action of the hardware item, a determination of a start of the action, and a selection of a duration of the action. Options available to the user for the configuration of the behavior of the programming object may vary and be dependent on the type of programming object selected.

A behavior of programming object(s) related to sensing object(s) may comprise conditional commands, wherein the conditional commands are defined through the selection of one or more of the type of sensing object, a port that said sensing object is connected to, a condition of the sensing object, a signal level condition, and a dependent acting object responding to the condition of the sensing object, wherein the behavior of the acting object(s) is defined as an action that occurs while said sensing object condition occurs or after a change occurs in said sensing object condition. The conditional commands may comprise encompassing conditional commands and/or may comprise one or more of an "IF" command and a "WHILE" command. The condition of the sensing object, for example, may comprise one of "ON" and "OFF".

The programming objects within the conditional commands, for example, may be executed for as long as the conditional command holds true or false when the conditional command comprises a "WHILE" command, and wherein the programming objects within the conditional commands are executed when the status of the conditional command changes from false to true and vice-versa when the conditional command comprises an "IF" command.

A programming object may be executed while the previous programming object is being executed when the behavior of the programming object is set to operate "WITH PREVIOUS" or a programming object is executed after the previous programming object has been executed when the behavior of the programming object is set to operate "AFTER PREVIOUS" and wherein with the "AFTER PREVIOUS" behavior selection the user can also define a delay after the completion of the execution of the previous programming object after which the programming object is executed.

The "WITH PREVIOUS" operation, for example, may comprises all of the previous programming objects regardless of whether some of the previous actions have been completed or are still in active mode. For example, if all programming objects are set to behave "WITH PREVIOUS", then the order by which the programming objects are arranged may be deemed irrelevant and all programming objects are executed in parallel. In another example, a conditional command may be placed after another conditional command, wherein the user can select a logical "OR" or a logical "AND" relationship to the previous conditional command, and the two conditional commands will operate according to the logical relationship selected. Multiple conditional commands may be placed one after another having an "AND" or an "OR" logical relationship to the previous conditional command.

The conditional command may be visually represented as an expanding shape that has a command heading area representation of the "IF" or the "WHILE" command and an acting object area, wherein said acting object area expands when an acting object is dropped into the acting object area to create space as an additional placeholder for another acting object to be dropped based on user input. In one example, when two or more acting objects are dropped into the acting object area of the encompassing command, all acting elements will operate under the behavior conditions set for the encompassing command and the behavior condition set for each acting element itself as a logical AND of the two behavior conditions.

Icons may be placed in the visual programming area one or more of a drag and drop operation from the icon bar, a double-click-and-select operation from icon bar, and a selection action performed on the simulator window. In an instance where hardware has not been connected to the computer, the selection action on the simulator window comprises a drag-and-drop operation of a component from the component bar at the simulator window to the relevant port or a selection operation at the port itself, and wherein in the case that the hardware has been connected to the computer, the representation in the simulator window will match the hardware configuration and the selection of a programming object is made by simple selection of a component represented in the simulator window.

Example 5

A method of introducing children to programming comprises initiating a reference to a hardware device, wherein the hardware device comprises a sensing object and an acting object. A linear representation of programming objects is presented, wherein a relationship of a current programming object to a previous programming object is established via one or more of a "WITH PREVIOUS" and "AFTER PREVIOUS" behavior option, wherein a current programming object is executed while the previous programming object is being executed when the behavior of the current programming object is set to operate "WITH PREVIOUS", and wherein the current programming object is executed after the previous programming object has been executed when the behavior of the programming object is set to operate "AFTER PREVIOUS", and wherein the "AFTER PREVIOUS" behavior selection defines a delay after the completion of the execution of the previous programming object after which delay the command is executed, and wherein when the "WITH PREVIOUS" option is selected, the current programming object is executed in parallel to the previous programming object, and wherein when a number of consecutive programming objects each have respective behaviors defined as "WITH PREVIOUS", the order of the consecutive programming objects is irrelevant.

Conditional commands may be further provided relating to sensing elements of the hardware device, wherein the conditional commands comprise one or more of an "IF" command and a "WHILE" command, and wherein the conditional commands are defined through a selection of the type of sensing object, a port that said sensing object is connected to, a condition of the sensing being ON, OFF, or a signal level condition, and a dependent acting object configured to respond to the condition of the sensing object, wherein the conditional commands are represented a encompassing commands, wherein the behavior of the acting objects are defined as an action that occurs while said sensing object condition occurs or after a change in said sensing object condition occurs, wherein the programming objects within the encompassing conditional commands are executed for as long as the conditional command holds true or false when the conditional command is a "WHILE" command, and the programming objects within the encompassing conditional commands are executed when the status of the conditional command changes from false to true and vice-versa when the conditional command is an "IF" command, and wherein when a conditional command is placed after another conditional command, the user can select a logical "OR" or a logical "AND" relationship to the previous conditional command, and the two conditional commands operate according to the logical relationship selected, and where multiple conditional commands may be placed one after the other having an "AND" or an "OR" logical relationship to the previous conditional command, and wherein multiple conditional commands may be placed one after the other having an "AND" or an "OR" logical relationship to the previous conditional command.

Example 6

A method of teaching concepts of computer programming to children comprises a reference to a hardware device such as a toy robot, the hardware device may be real or virtual, and simultaneously viewing of at least three aspects of the program comprising: text view of the code; flow diagram views having visual entities, each entity representing a block of code, which said visual entities can be selected and connected together in the form of a flow diagram; simulation view showing the hardware device configuration and the response of the device to the code. Each view may be selectively synchronized to the action in another view and/or can be selectively reset to previous status. All views, for example, may be reset in a synchronized manner to previous status according to the last action of the user in any view.

Example 7

An interface for programming a robot comprises three or more windows, the size of each window being adjustable. The windows include at least a hardware device simulator, a graphical programming window, and a text editor the views in the windows being linked to the core code produced either through graphical programming or via text code entry. The window with the device simulator can be adjusted in size and in doing so the image of the device is automatically scaled up or down to fit into the window.

Example 8

A method for enabling children to easily create relational statements while learning programming comprises an interface window where relationships between objects can be created in a visual manner, a set of icons, each icon representing a block of programming code, wherein said icons can be placed into the graphical programming area and can be connected in a flow diagram to create relationships and dependencies. The icons, once placed into the graphical programming area, represent programming objects which correspond to the behavior of a hardware item of the hardware device, such as a first motor of a toy robot, and which objects can be configured to behave in a specific manner in relation to a previous object. The programming objects are configured in terms of selection of port on the hardware device, selection of the nature of action, determination of the start of action, selection of duration of action. The icons may represent sensing objects corresponding to some type of physical sensor such as a proximity sensor. Acting objects corresponding to a physical object may comprise a motor, an LED or a buzzer. Options available to the user for the configuration of the behavior of the objects are dependent on the specific object selected. Behavior of programming objects related to sensing objects is represented in the form of encompassing conditional commands, such as an "IF" or "WHILE" command, wherein the conditional commands are defined through the selection of the type of sensing object, the port that said sensing object is connected to, the condition of the sensing object such as ON, OFF, signal level condition and the dependent acting object that would respond to the condition of the sensing object, wherein the behavior of the acting objects is defined as an action that happens while said sensing object condition occurs or after a change in said sensing object condition.

The programming objects within the encompassing conditional commands may be executed for as long as the conditional command holds true or false when the conditional command is a "WHILE" command; the programming objects within the encompassing conditional commands are executed when the status of the conditional command changes from false to true and vice-verse when the conditional command is an "IF" command.

Example 9

A method for introducing children to programming in a simple manner provides a reference to a hardware device such as a toy robot, wherein the hardware device comprises of sensing objects such as a sensor and acting objects such as a motor. A linear representation of programming objects that is easily understood by children can enable advanced programming through the definition of the relationship of one programming object to the previous programming objects by the use of "WITH PREVIOUS" or "AFTER PREVIOUS" behavior options, wherein a programming object is executed while the previous programming object is being executed when the behavior of the programming object is set to operate "WITH PREVIOUS" or a programming object is executed after the previous programming object has been executed when the behavior of the programming object is set to operate "AFTER PREVIOUS". The "AFTER PREVIOUS" behavior selection can allow the user to further define a delay after the completion of the execution of the previous programming object after which delay the command is executed. When the "WITH PREVIOUS" option is selected, the current programming object is executed in parallel to the previous programming object and therefore when a number of consecutive programming objects all have their behavior defined as "WITH PREVIOUS" the order of these programming objects is irrelevant. Conditional commands such as an "IF" or "WHILE" commands relate to sensing elements of a hardware device and the conditional commands are defined through the selection of the type of sensing object, the port that said sensing object is connected to, the condition of the sensing object such as ON, OFF, signal level condition, and the dependent acting object that would respond to the condition of the sensing object. The conditional commands are represented like encompassing commands wherein the behavior of the acting objects is defined as an action that happens while said sensing object condition occurs or after a change in said sensing object condition occurs. The programming objects within the encompassing conditional commands are executed for as long as the conditional command holds true or false when the conditional command is a "WHILE" command and the programming objects within the encompassing conditional commands are executed when the status of the conditional command changes from false to true and vice-verse when the conditional command is an "IF" command. When a conditional command is placed after another conditional command, the user can select a logical "OR" or a logical "AND" relationship to the previous conditional command, and the two conditional commands will operate according to the logical relationship selected and where multiple conditional commands may be placed one after the other having an "AND" or "OR" logical relationship to the previous conditional command. Multiple conditional commands may be placed one after the other having an "AND" or an "OR" logical relationship to the previous conditional command.

Although the disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several embodiments, such feature may be combined with one or more other features of the other embodiments as may be desired and advantageous for any given or particular application.

What is claimed is:

1. A robotics system for teaching concepts of computer programming to a user, the robotics system containing software for:
    providing a reference to a device;
    concurrently providing on a display a plurality of views associated with a programming of the device, the plurality of views comprising:
        a textual view, wherein a programming code for controlling the device is displayed as text;
        a graphical view, wherein a plurality of icons are provided in the graphical view, wherein the plurality of icons are configured to be selectively placed, interconnected, and modified in the form of a flow diagram in a programming area of the graphical view, and wherein a configuration of the plurality of icons, when placed in the programming area, respectively represent a plurality of blocks of the programming code, wherein each of the plurality of blocks of the programming code respectively corresponds to a behavior of a respective programming object of the device, and wherein the plurality of blocks of the programming code behave in a specific manner and in relation to one another based on the configuration of the plurality of icons; and
        a simulation view, wherein the simulation view is configured to display a configuration of the device and a response of the device to the programming code; and
    accepting input from an input device by the user for modifying the programming code in the textual view, the icons and selective interconnection thereof in the graphical view, and the configuration of the device in the simulation view, therein modifying the programming of the device.

2. The robotics system of claim 1, wherein the plurality of icons respectively comprise a selectable operation option comprising a "WITH PREVIOUS" and "AFTER PREVIOUS" indicator, wherein the selectable operation option is selectively configured as one of a "WITH PREVIOUS" configuration and an "AFTER PREVIOUS" configuration, respectively, wherein the "WITH PREVIOUS" configuration concurrently executes a first of the plurality of blocks of the programming code and a second of the plurality of blocks of the programming code, and wherein the "AFTER PREVIOUS" configuration serially executes the second of the plurality of blocks of the programming code after the execution of the first of the plurality of blocks of the programming code.

3. The robotics system of claim 2, wherein the plurality of icons are further selectively configured to provide a selectable delay, wherein the "AFTER PREVIOUS" configuration serially executes the second of the plurality of blocks of the programming code after the execution of the first of the plurality of blocks of the programming code and the selectable delay.

4. The robotics system of claim 3, wherein the "AFTER PREVIOUS" configuration serially executes the second of the plurality of blocks of the programming code after a completion of the execution of the first of the plurality of blocks of the programming code and the selectable delay.

5. The robotics system of claim 2, wherein the configuration of the plurality of icons further comprises one or more icon options selectably presented to the user, wherein the one or more icon options are selected from a group consisting of a port associated with the programming object, a condition of the programming object, a nature of an action of the programming object, a start time of the action, and a duration of the action.

6. The robotics system of claim 5, wherein the programming object comprises one or more of a sensing object and an acting object.

7. The robotics system of claim 6, wherein the sensing object comprises one or more of a proximity sensor, a video sensor, and an audio sensor, and wherein the acting object comprises one or more of a motor, a visual device, an audio device, an LED, and a buzzer.

8. The robotics system of claim 7, wherein the one or more icon options further comprise one or more conditional commands associated with the programming object.

9. The robotics system of claim 8, wherein the one or more conditional commands are based on the nature of the action of the sensing object, the port associated with the sensing object, the condition of the sensing object, a signal level condition of the sensing object, and a response of a dependent acting object to the condition of the sensing object, wherein the response of the dependent acting object comprises an action of the acting object that occurs concurrent with the condition of the sensing object or after a change in the condition of the sensing object occurs.

10. The robotics system of claim 8, wherein the one or more conditional commands comprise one or more of an "IF" command and a "WHILE" command.

11. The robotics system of claim 8, wherein the one or more conditional commands associated with the programming object execute the acting object for as long as a status of the respective conditional command holds true when the respective conditional command comprises the "WHILE" command, and wherein the one or more conditional commands associated with the programming object execute the acting object when the status of the respective conditional command changes when the respective conditional command comprises the "IF" command.

12. The robotics system of claim 1, wherein the plurality of views are updated and synchronized after the modification of one or more of the programming code, the plurality of icons, and the configuration of the device in any of the plurality of views, wherein plurality of views are configured to be updated and synchronized manually, automatically, or after a predefined pause after said modification.

13. The robotics system of claim 12, wherein the plurality of views are reset to a previous state upon a request by the user after the plurality of views are updated and synchronized.

14. The robotics system of claim 1, wherein one or more icons are placed in the programming area of the graphical view by one or more of a drag and drop operation from an icon bar, a double-click-and-select operation from the icon bar, and a selection action performed in the programming area of the graphical view.

15. The robotics system of claim 1, wherein the device comprises a robotic toy in one or more of a physical form and a virtual form.

16. The robotics system of claim 15, further comprising a physical device and a computer, wherein the software resides on the computer, and wherein providing the reference to the device comprises providing a link between the physical device and the computer.

17. The robotics system of claim 1, wherein the configuration of the plurality of icons comprises one or more options selectably presented to the user, wherein the one or more options are selected from a group consisting of a port associated with the programming object, a condition of the programming object, a nature of an action of the programming object, a start time of the action, and a duration of the action.

18. The robotics system of claim 1, wherein the plurality of icons respectively comprise a selectable operation option comprising a "WITH PREVIOUS" and "AFTER PREVIOUS" indicator, wherein the selectable operation option is selectively configured as one of a "WITH PREVIOUS" configuration and an "AFTER PREVIOUS" configuration, respectively, wherein the "WITH PREVIOUS" configuration concurrently executes a first of the plurality of blocks of the programming code and a second of the plurality of blocks of the programming code, and wherein the "AFTER PREVIOUS" configuration serially executes the second of the plurality of blocks of the programming code after the execution of the first of the plurality of blocks of the programming code, and wherein the "WITH PREVIOUS" configuration and "AFTER PREVIOUS" configuration are further displayed as text in the textual view.

19. The robotics system of claim 18, wherein the plurality of icons are further selectively configured to provide a selectable delay, wherein the "AFTER PREVIOUS" configuration serially executes the second of the plurality of blocks of the programming code after the execution of the first of the plurality of blocks of the programming code and the selectable delay.

20. The robotics system of claim 19, wherein the "AFTER PREVIOUS" configuration serially executes the second of the plurality of blocks of the programming code after a completion of the execution of the first of the plurality of blocks of the programming code and the selectable delay.

* * * * *